March 6, 1928.
J. W. BRYCE
1,661,556
SCALE
Filed May 12, 1921
7 Sheets-Sheet 3
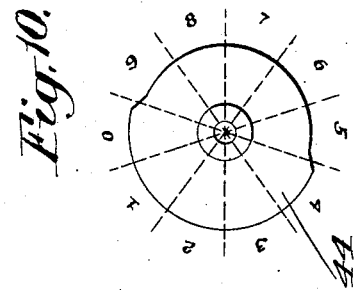
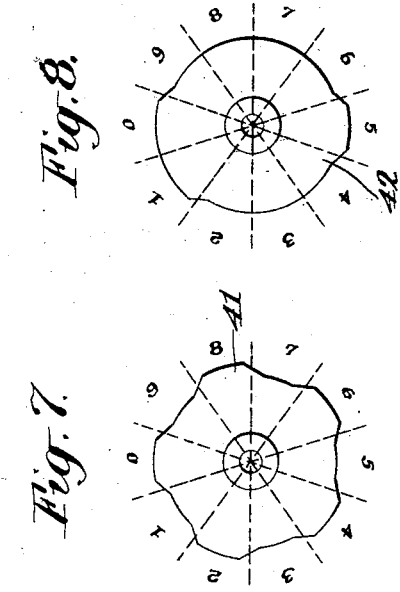
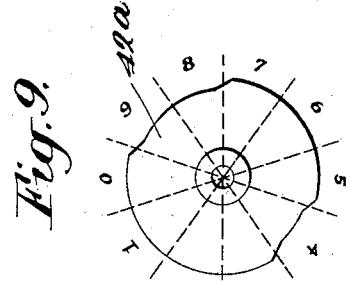
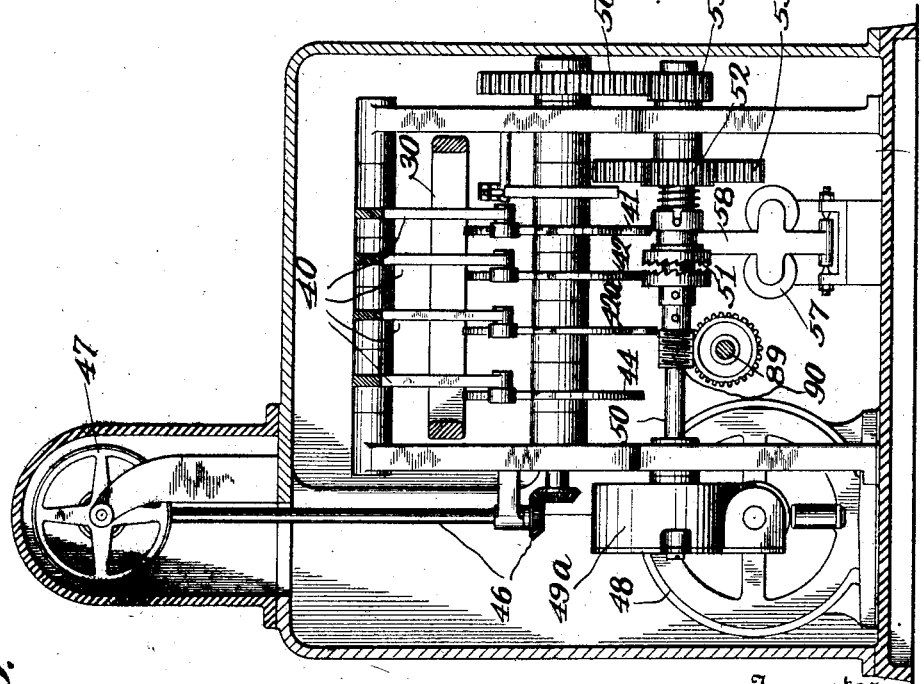
Inventor
James W. Bryce
By his Attorneys
Kerr Page Cooper & Hayward March 6, 1928.
J. W. BRYCE
1,661,556
SCALE
Filed May 12, 1921
7 Sheets-Sheet 4
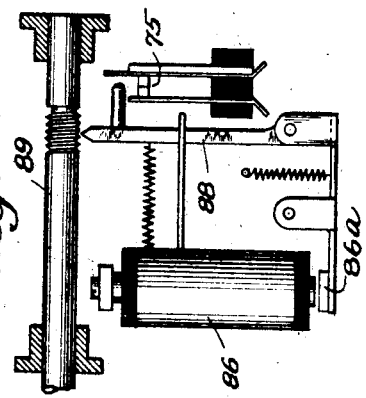
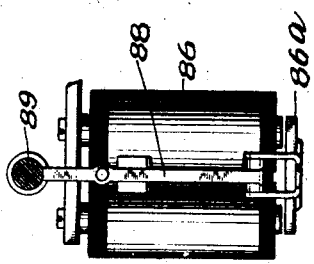
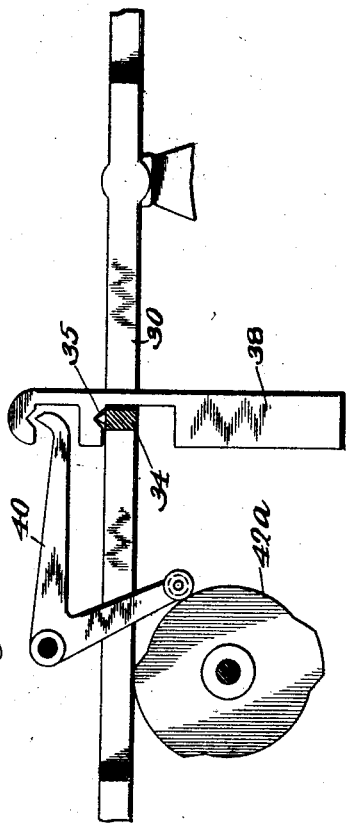
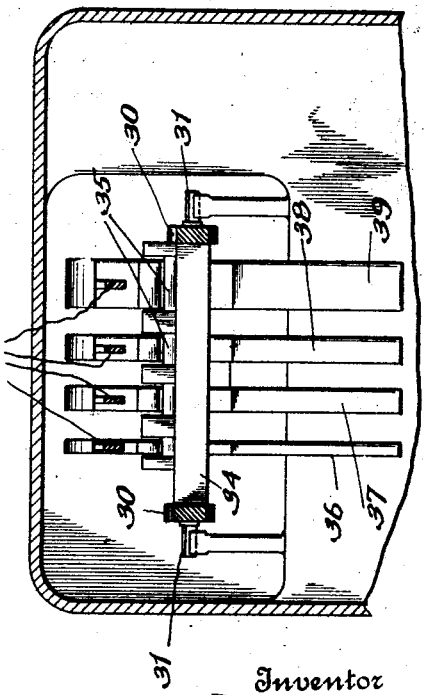
Inventor
James W. Bryce
By his Attorneys
Kerr Page Cooper & Hayward

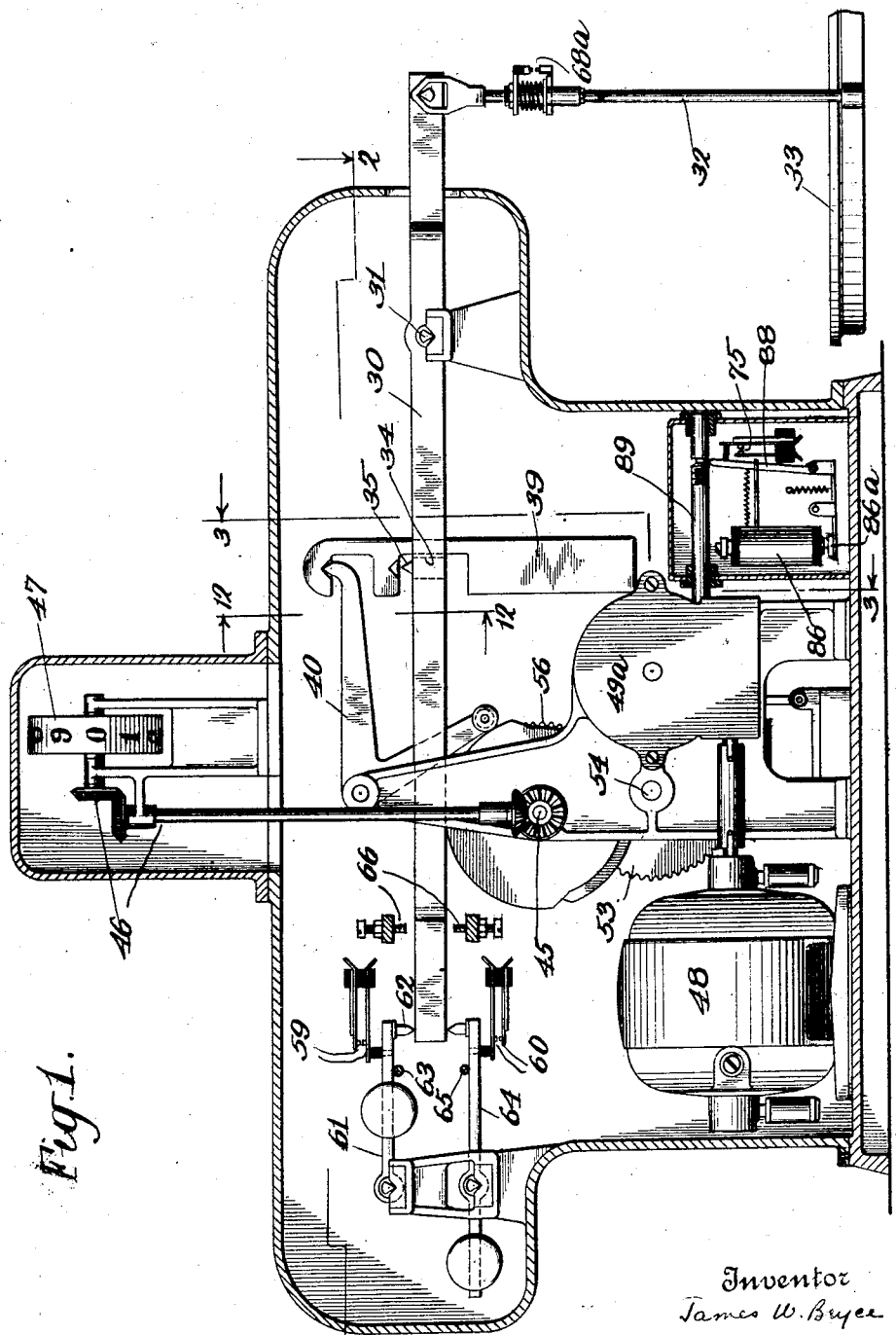

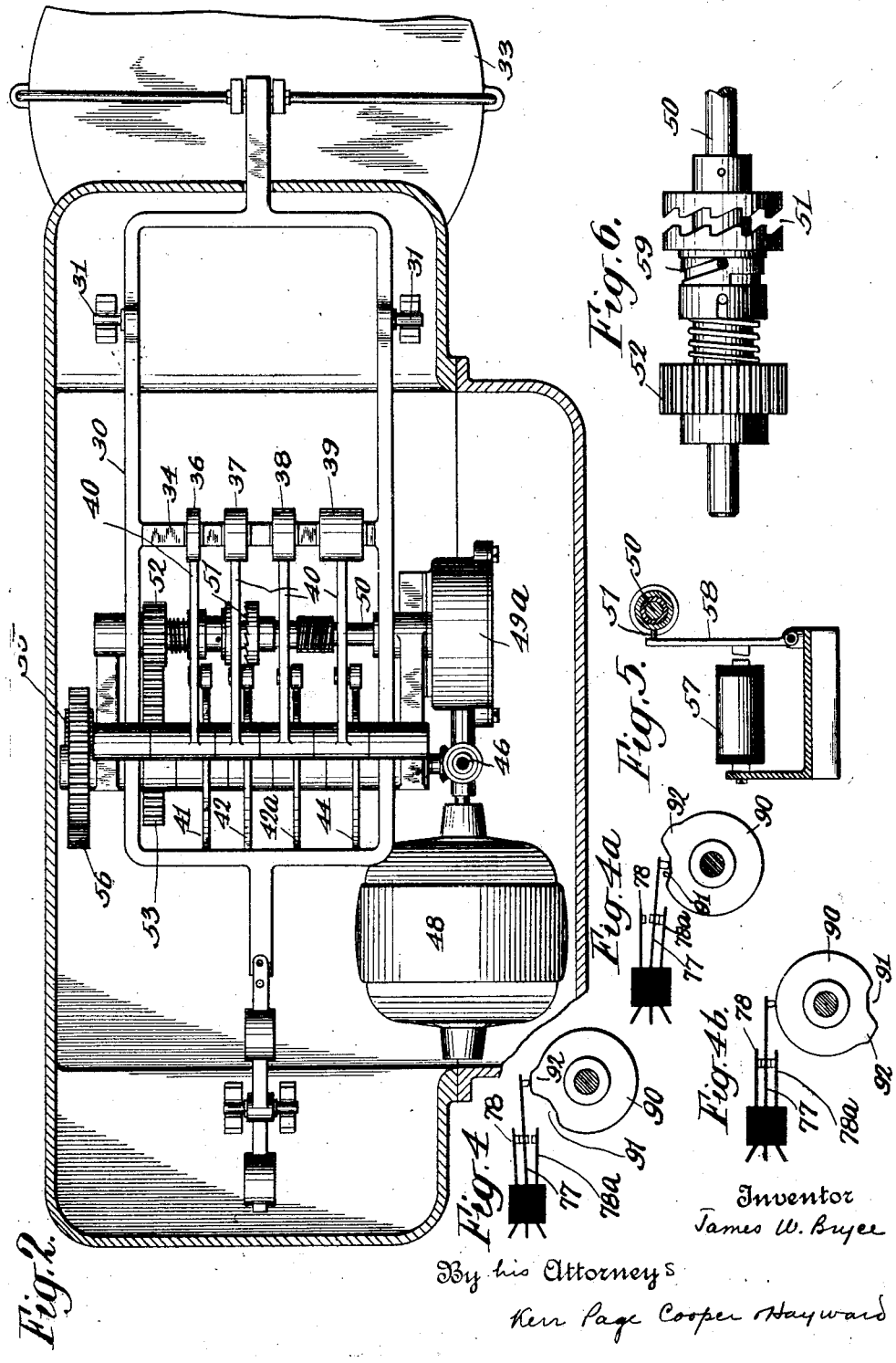

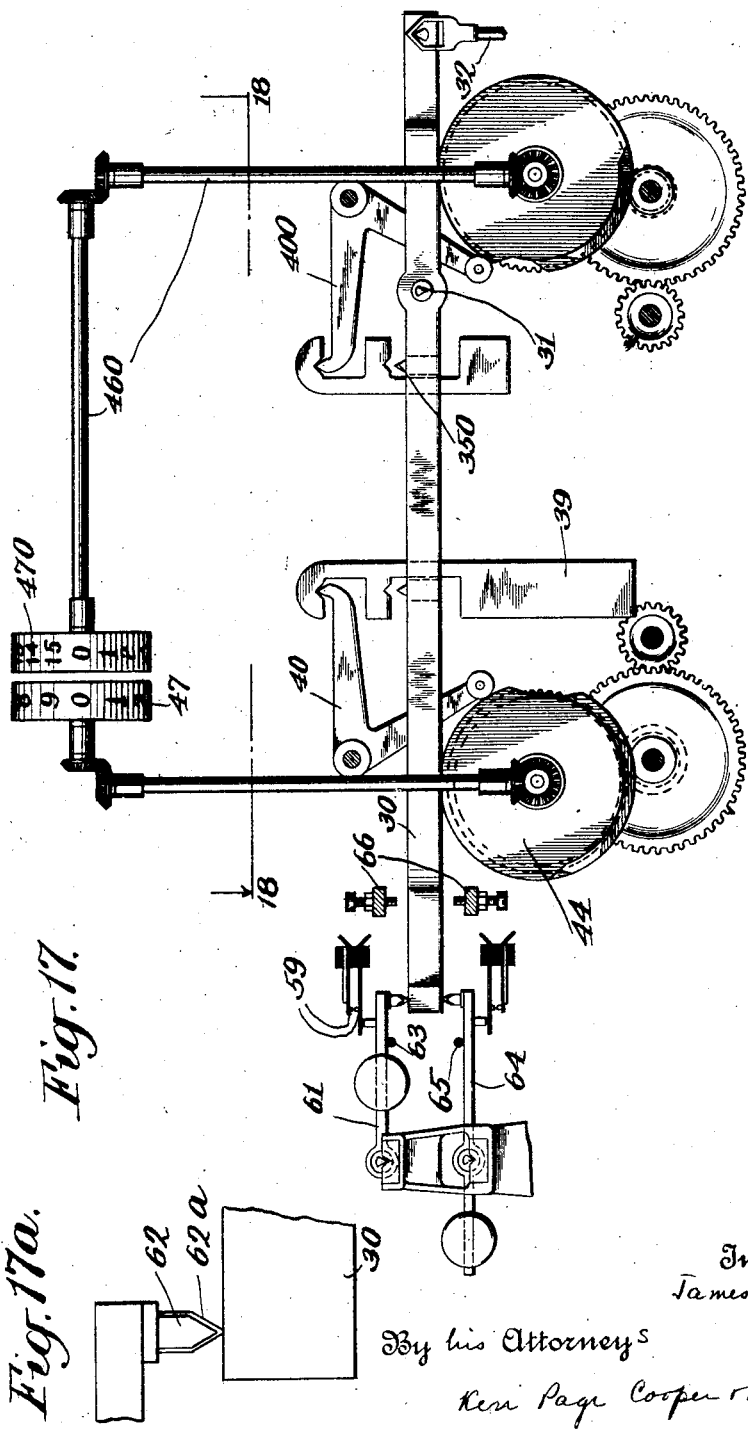

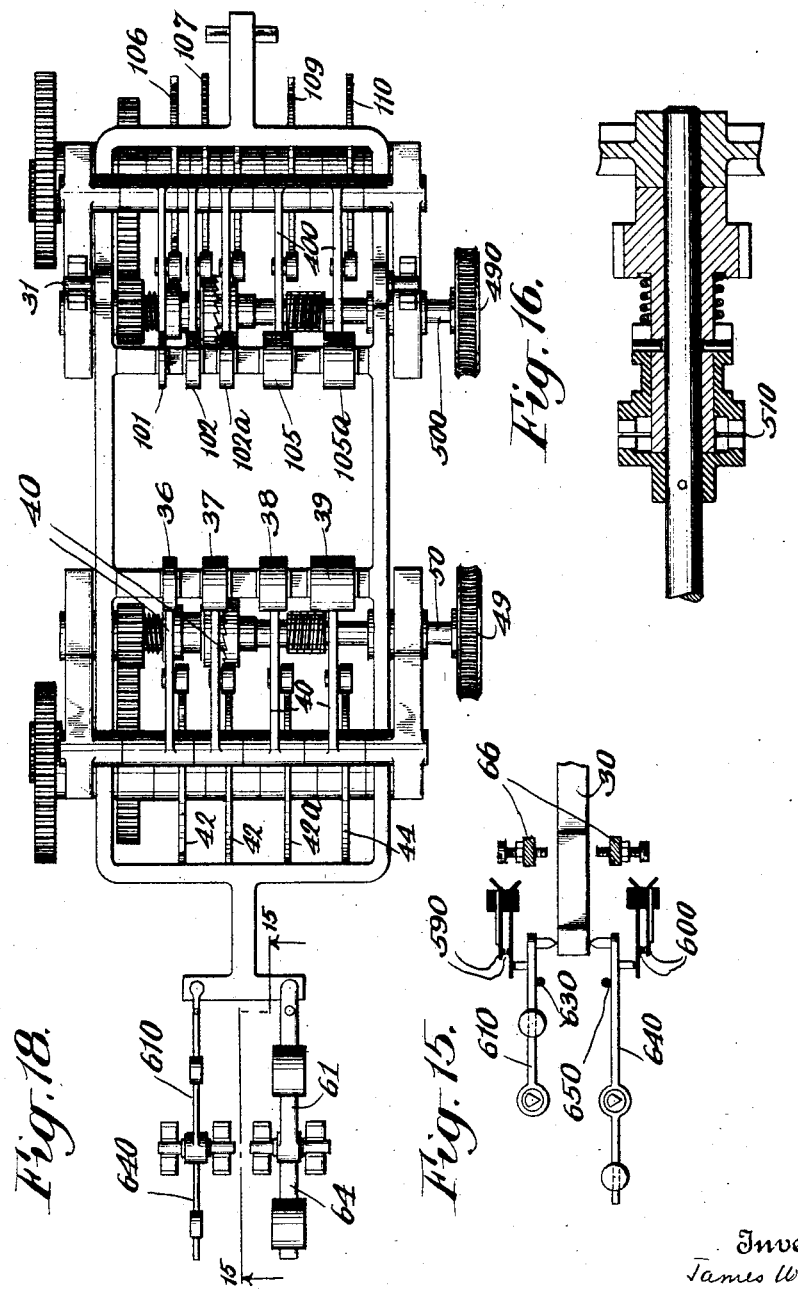

March 6, 1928.
J. W. BRYCE
SCALE
Filed May 12, 1921
1,661,556
7 Sheets-Sheet 7
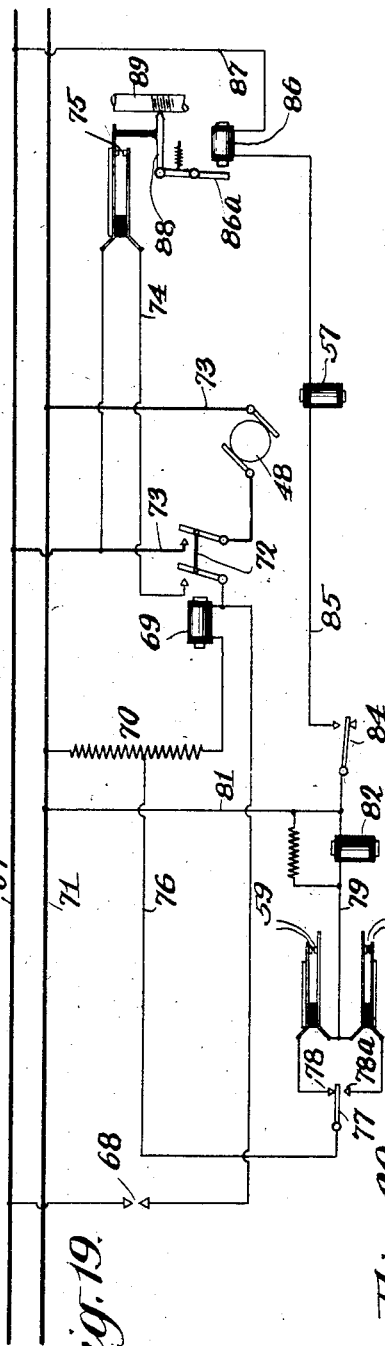
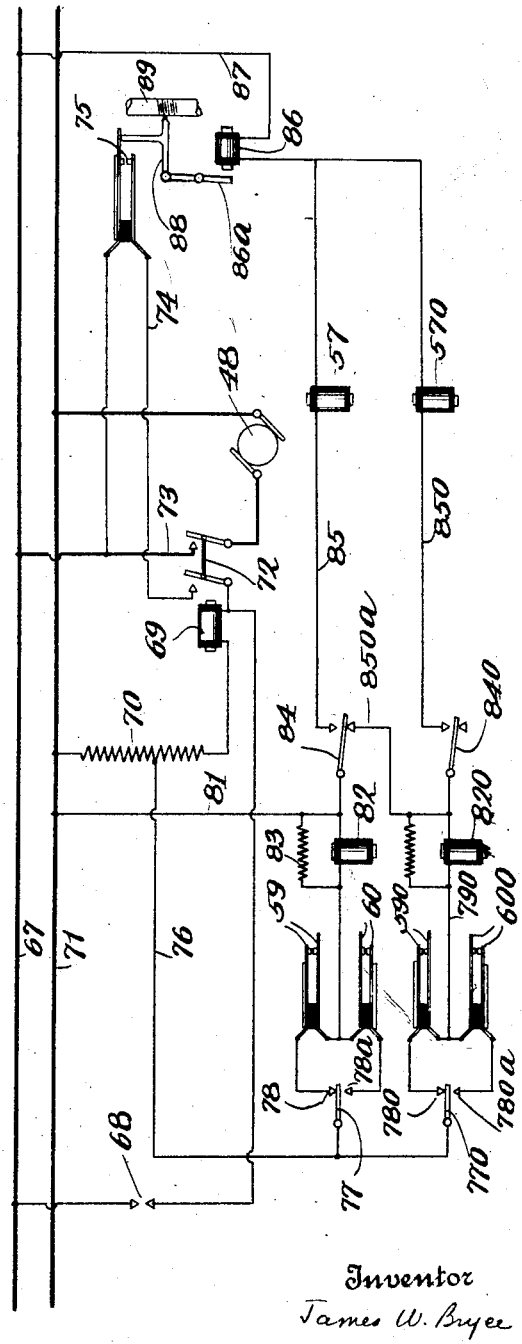
Inventor
James W. Bryce
By his Attorneys
Kerr Page Cooper Hayward Patented Mar. 6, 1928.

1,661,556

UNITED STATES PATENT OFFICE.

JAMES W. BRYCE, OF BINGHAMTON, NEW YORK, ASSIGNOR, BY MESNE ASSIGNMENTS, TO DAYTON SCALE COMPANY, OF DAYTON, OHIO, A CORPORATION OF NEW JERSEY.

SCALE.

Application filed May 12, 1921. Serial No. 468,836.

It has been well known in the scale art that one of the most accurate and sensitive scales is the well known even balance type of scale in which the live loads are applied to one arm of a lever and the offsetting weights to the other. These types of scales while satisfactory as regards accuracy require slow manual manipulations of the offsetting weights and have been largely displaced by automatic scales in which certain parts are variably displaced by the applied load. Such automatic scales, while more rapid in their weighing operations, are more difficult to seal and manufacture than the even balance type and are more subject to friction and other errors which are caused by the variable displacement of the parts under varying loads.

The present invention has, in part, for its object the provision of a new type of automatic weighing machine which will retain the principle and desirable advantageous features of the even balance type of scale and at the same time secure the desired operation characteristics of automatic scales.

Other objects reside in the provision of a weighing machine which will off-set the live load by means of off-setting weights which are applied automatically in particular combinations to the scale beam and in which the change in weight combinations is interrupted automatically upon the beam attaining equilibrium.

Other objects of the invention are directed to an improved weighing machine of the even balance type in which weights are applied and removed to the beam by a separate power source and in which their application and removal are controlled by the overbalanced condition of the beam.

Other objects and advantages will readily appear from the following description in which reference is had to the accompanying drawings, which illustrate certain embodiments of the invention by way of exemplification and wherein like reference characters refer to similar parts in the various views.

In the drawings:

Fig. 1 shows a side view of a simple embodiment of my invention.

Fig. 2 is a top view taken on line 2—2 of Fig. 1.

Fig. 3 is an end section view taken on line 3—3 of Fig. 1.

Figs. 4, 4ª and 4ᵇ show detail views of different positions of the limit contacts.

Figs. 5 and 6 are detail views showing one of the clutches and the magnets for controlling the same.

Figs. 7, 8, 9 and 10 are detail views showing the permutation or factoring cams.

Fig. 11 is a detail showing the scale beam, one weight and the cam therefor.

Fig. 12 is a sectional view taken on line 12—12 of Fig. 1 and showing the scale beam and four cooperating weights.

Fig. 13 and Fig. 14 are detail views of the time limit relay.

Fig. 15 is a detail view of the ounce controlling contacts which are used in another embodiment of the invention. This view is a section taken on line 15—15 of Fig. 18.

Fig. 16 is a detail sectional view of the controlling clutch shown in the assembly shown in Fig. 3 and in elevation in Fig. 5. This clutch is also duplicated and used in the embodiment shown in Fig. 18.

Fig. 17 is a side elevation of an embodiment of the invention in which pound weights and ounce weights are used to effect weighings to the nearest pound and ounce or other like factors of weight made up of a plurality of components. Fig. 17ª is an enlarged detail sectional view showing the ounce and pound knife edges and the varying length of the same.

Fig. 18 is a plan view of the embodiment shown in elevation in Fig. 17. The section is taken on line 18—18 of Fig. 17.

Fig. 19 is a circuit diagram showing the wiring connections for the embodiment of the invention shown in Fig. 1.

Fig. 20 is a circuit diagram showing the embodiment of the invention shown in Figs. 17 and 18.

The mode of operation of my improved machine and method of weighing will be best understood by an explanation of the simple embodiment shown in Fig. 1. In this embodiment the weighing capacity is limited to 9 units but it will be understood that the number of units may be increased as desired by a simple extension and amplification of the principle and construction which may be best understood from the device now to be explained.

It will be assumed for convenience in description that each weight unit is equal to one pound. However, any desired unit of weight may be used such a ounces, kilograms, etc.

Referring to Figs. 1 and 2, 30 represents a scale lever carrying fulcrum pivots 31, supported in suitable bearings, and having connected thereto a draft rod 32, which connects to a suitable load support such as platform 33. As shown in Fig. 2, the lever 30 is preferably in the form of a rectangular frame to afford good lateral stability thereto and to provide clearance for certain operating mechanism. The beam may be made in a variety of forms depending upon the design of the associated parts. Extending across the lever is a cross bar 34 carrying a series of knife edges 35 preferably in alignment and adapted to receive a weight or weights. In the present embodiment I employ four weights 36, 37, 38, 39, said weights being of such mass that they individually offset loads of 1, 2, 3 and 4 pounds upon the pan 33. The actual amount of metal in each weight will of course depend upon the ratio of the arms of lever 30. The weights are deposited upon the beam and removed therefrom by finger arms 40. There is one of these arms for each weight and the arms are mounted to rock upon a suitable cross shaft. Fig. 1 shows the finger arms displaced so that all weights are removed from the beam and Fig. 11 shows the arm rocked to apply a weight thereto. The finger arms are selectively operated by cams 41, 42, 42ª, and 44 (Fig. 3). These cams operate concurrently and by a particular arrangement of their contours I am enabled to obtain nine combinations of actions of the finger arms. Figs. 7 to 10 show the contours of these cams. Cam 41 controls the weight 36, which offsets one pound, 42 controls 37, offsetting two pounds, and 42ª controls 38, offsetting two pounds. 44 controls 39, offsetting four pounds. By selectively operating one or more of the finger arms and thereby applying a selected combination of weights to the beam, I am enabled to offset any load from one to nine pounds by four weights. This result is obtained by what may be termed a factoring operation of the cams 41, 42, 42ª and 44 and I will therefore term these cams factoring cams. One combination of weights which gives the desired combination of results is as follows:

| Load to be offset. | Offsetting weights applied. |
|---|---|
| 1 | 1 pound |
| 2 | 2 |
| 3 | 2+1 |
| 4 | 4 |
| 5 | 4+1 |
| 6 | 4+2 |
| 7 | 4+2+1 |
| 8 | 4+2+2 |
| 9 | 4+2+2+1 |

All of the factor cams are rigidly fastened to a cam shaft 45 and by positioning this shaft to one of the ten positions, the above factoring operations are carried out and the proper weights may be selectively removed and applied to the beam to offset the load. To display, indicate or record the result, I provide suitable gearing and shafting 46 connecting the cam shaft 45 with a wheel 47. This wheel is here shown as an indicating wheel but it may also be a type wheel if it is desired to record the result. Hereafter, when the term indicating is used, it will be understood to broadly cover equivalent methods of displaying the result such as printing.

The cam shaft 45 is rotated by means of a motor 48, which through reducing gearing 49 (partly shown in Fig. 18) in housing 49ª, drives one end of a clutch shaft 50 (Fig. 3). Carried by this shaft is a suitable one revolution magnetically and spring controlled clutch 51, best shown in Fig. 6. The driven member of this clutch carries a pinion 52, which meshes with a gear 53 on a lay shaft 54 (Figs. 1 and 3). Pinion 55 on the end of the lay shaft meshes with a gear 56 on the cam shaft 45. The gear reduction is such that for each complete revolution of the clutch shaft 50, cam shaft 45 will be turned sufficiently to effect one change of the finger arms and weights.

The one revolution clutch is arrange to be engaged by the energization of a magnet 57, which retracts an arm 58 from the cam slot 59 of the clutch allowing the spring to engage the jaws thereof. Upon deenergization of the magnet, the arm drops back into the cam slot 59. The jaws do not immediately disengage; but the driven end of the clutch completes its revolution, if already started. Disengagement of the jaws is effected at the end of the revolution by the arm 58.

In order to control the operation of the clutch 51, I provide control devices for the magnet 57. These devices will now be described.

Beam 30 is a beam of the even balance type and assumes a predetermined and fixed position of equilibrium when the applied weights exactly offset the load upon support 34, or when there are neither weights nor live load upon the beam. The beam 30 will tend to tilt clockwise or anti-clockwise depending upon whether the applied load exceeds or is less than the weights upon the left hand side of the beam. Disposed adjacent the left hand end of the beam are devices which I term pilot weight devices. These devices are arranged to control the opening and closure of contact devices which in turn control the clutch magnet circuit. The purpose of these devices is to determine the loading condition of the beam and either effect the application of an additional weight or weights to the beam or effect the removal of one or more therefrom.

Referring to Fig. 1, contacts 59 are normally open and when closed establish circuits which control the application of weights. Contacts 60 control the removal of weights. Adjacent the end of the beam is a pilot weight device which comprises a weighted lever 61, underlying contacts 59 and having a knife edge 62 to cooperate with the beam. The weighted lever is pivotally mounted and its movement towards the beam is limited by a suitable stop 63. The position of this stop and the proportions of the parts are such that, with the beam in equilibrium, no pressure or substantially no pressure, will be exerted against the beam by the lever. When the beam tends to swing upwardly against the knife edge under the power of overbalancing loads, its movement will be restrained by the pilot weight device. Upon the application of an overbalancing force of one pound or more to the right hand end of the beam, the weighted lever will be elevated clear of its stop sufficiently to close the contacts 59. Weights will then be applied to beam to restore it to a position of equilibrium, whereupon the pilot weight device will again descend, opening contacts 59. The pilot weight device therefore acts to restrain the beam movement for all overbalancing forces of less than a pound. For forces greater than one pound the pilot weight device is overcome and the contacts closed. The device in its action differentiates from other contact devices controlled by scale beams in that the position of the beam is not the primary controlling factor in the operation of the contacts. The control, in reality, is a control based upon the reacting pressure between the beam and the pilot device and when this pressure exceeds a predetermined amount the pilot weight device will move and will close the contacts, and when it is less than a predetermined amount, the pilot device will open the contacts irrespective of the instant position of the beam. By the use of a pilot device interposed between the beam and the contacts, I am able to secure a more reliable contact action and a control which will not be disarranged by a slight change in contact position due to wear or improper adjustment. Also I may regulate the sensitiveness of the scale within any desired range. That is to say the scale may be made sensitive to pounds or ounces, etc.

The pilot device 64 underneath the beam acts in a similar manner to the device just described, except that the device is overweighted so as to be normally swung upward towards the beam and against stop 65. This device acts upon the swinging of the beam in a counterclockwise direction when the applied load is overbalanced by the weights upon the left of the beam fulcrum instead of underbalanced as before. The contacts 60 are closed when the applied weights overbalance by one pound or more the load upon the pan and are open under all other conditions. I have heretofore referred to the beam 30 as having a swinging movement. It will be understood, however, that the actual beam movement is very slight and the word swinging refers more exactly to the tendency to swing them to any extreme displacement. In its action the beam is practically static and its range of movement may be limited to an amount just sufficient to permit contact closure by the adjustable stops 66.

To understand the cycle of operation, assume that the scale is at rest with no load thereon and with all weights off the beam. Assume an unknown weight placed upon the pan. This weight will be assumed to be 7 pounds. The operator then establishes a circuit 66 from line 67 (Fig. 19) by pressing a suitable push button which closes contacts 68. (If desired these contacts may be closed automatically by the scale by draft rod contacts 68ª.) Current flows from the line through wire 66, magnet 69 and back through resistance 70 to line 71. Energization of magnet 69 attracts a switch device 72 thereby connecting motor 48 across the line by circuit 73. A stick circuit 74 is also established through contacts 75 (now closed) for the magnet 69 permitting the reopening of the push button contacts. Motor rotation starts and continues as long as 69 is energized. The pilot weight device 61 has now closed contacts 59 and a circuit 76 is established, which is tapped in potentiometer connection across part of the resistance 70. This circuit goes through contact blade 77, contact 78, contacts 59, wire 79, relay magnet 82, wire 81 to line 71. The flow of current in this circuit is kept down and the open circuit voltage across contacts 59 is kept within desired limits by means of the potentiometer connection 70—76. Current and voltage is limited by the drop of potential across resistance 70. Sparking due to inductance of relay 82 may be minimized by a suitable resistance 83. The energization of magnet 82 picks up a relay 84 and establishes a circuit traced as follows. From line 71, through wire 81, relay 84, wire 85, clutch magnet 57, time limit relay magnet 86, wire 87, and back to line 67. The clutch 51 is now engaged and the motor 48 now rotates the cam shaft 45, applying and removing and reapplying the weights to the beam, until the proper number are in position to restore the beam to equilibrium. When the beam is at equilibrium with the supposed loading heretofore mentioned, the following weights will be upon the beam; 39, 37 and 36 corresponding to individual load offsetting value of 4 pounds, two pounds, and one pound or a total of 7 pounds. In reaching this point, the weight changing device had previously gone through the following cycle. The first revolution of the clutch shaft placed weight 36 on the beam. The second revolution removed weight 36 and applied weight 37. The third revolution reapplied weight 36. The fourth revolution removed 36, left 37 upon the beam, and applied 38. At the fifth revolution weight 36 was reapplied, 37 and 38 removed, and weight 39 applied. At the sixth revolution weight 36 was removed, weight 37 was applied and weight 39 was left on. At the seventh revolution weights 39 and 37 remained on, and weight 36 was applied.

With the beam again in equilibrium, the pilot device moves so that contacts 59 are again opened, interrupting the circuit to the clutch magnet 57, declutching clutch 51, and causing further weight changing to be stopped. During the period that the clutch magnet was energized the time relay magnet 86 was energized and had attracted its armature 86ª keeping a finger arm 88 out of contact with a screw shaft 89. This shaft is a slow rotating shaft driven by suitable reduction gearing 90 from clutch shaft 50 (see Fig. 3.) Upon deenergization of the time limit relay the finger arm is swung by its spring into contact with the threaded shaft and is fed along thereby. Eventually arm 88 opens contacts 75, thereby breaking the stick circuit 74, deenergizing magnet 69, and interrupting the circuit 73 to motor 48. The motor is now out of operation and comes to rest. By reason of the construction of the time limit relay, the parts will come to rest in the position shown with contacts 75 open. To close the contacts and permit the establishment of the stick circuit these contacts must be first reclosed. This is done automatically by the closure of the circuit through contacts 59 and since this circuit is established as soon as overbalancing load is placed upon the scale pan the contacts 75 will be closed at the time the push button is manipulated to commence a weighing.

When the parts have all come to rest the scale beam 30 will be in equilibrium, and the motor will have turned the cam shaft 45 through seven steps and will have concurrently turned the indicator or recorder wheel a similar amount to display or otherwise show the amount of the load. The actual turning of the wheel is effected by motor power entirely independent of the power of the load. Consequently the friction of the shafting and driving connections is not in any way detrimental to the scale and does not affect the accuracy of the result. It is therefore possible to drive mechanisms such as printing devices which require considerable power for their operation.

Assume now that all of the load be removed from the pan. The beam 30 will be overbalanced by the applied weights and contacts 60 will be closed. The motor 48 may be again set in operation by closing the push button contact 68; or if sufficient time has not elapsed to open the time limit relay, the motor will already be in circuit and rotating, contacts 60 being closed, will cause the clutch magnet 57 to be energized and clutch 51 engaged, whereby the clutch shaft will be recoupled to the cam shaft and the latter advanced, changing the weight combinations, successively applying more offsetting weight, and maintaining the overbalanced condition until the home position is reached. The beam will then be in equilibrium (all weights being removed) and the clutch will be disengaged upon the breaking of the circuit at contacts 60. After a lapse of time, the time limit relay will cut out the motor.

The operation will also be substantially the same if a part of the load is removed from the scale. The lower pilot weight will first close contacts 60 allowing the motor to bring the parts to home position and remove all the weights from the beam. The live load now overbalances the beam, thereby closing contacts 59. The motor is then recoupled to the cam shaft and weights are applied until the beam is again brought to equilibrium.

Means must be provided for preventing the device from running on indefinitely, if a weight is applied which is beyond the limit of capacity of the scale. For this purpose, I provide the limit contacts shown in Figs. 4, 4ª and 4ᵇ. I mount upon the cam shaft 45 a limit cam 90 having a depressed portion 91 and a raised portion 92. When the scale is in normal position, with no load, with all weights off, the parts are in the position shown in Fig. 4, blade 77 is in contact with 78 and out of contact with 78ª. Upon the application of a load to the beam contacts 59 will be closed and current can flow from line 76 to these contacts. Upon the turning of the cam shaft from zero position the limit contacts assume the position shown in Fig. 4ᵇ. Current can now flow from wire 76 to either of the contacts 59 or 60. If an excessive load is applied to the beam which is beyond the capacity of the scale the cam 90 will turn through a complete revolution and blade 77 will be drop into the depression 91 thereby opening the circuit to contacts 59 and maintaining a closed circuit to contacts 60. Under these conditions of loading, contacts 60 will be open and therefore the control circuit to relay 82 will be broken and the cam shaft will be declutched from the motor and repeat operations prevented. Upon the removal of sufficient load to permit the closure of contacts 60, the control circuit will be again reestablished and the clutch reengaged, whereby the cycle of operations will be continued as before until the live load is properly offset by the weights upon the beam.

The construction shown in Figs. 17, 18 and 20 shows a more extensive embodiment of the invention in which loads may be automatically offset to the nearest pound and ounce or other double order of weights.

The means for applying the ounce weights are substantially identical with the construction heretofore described for the pounds weight applying devices. For most of the parts similar reference characters will be applied with the suffix 0 designating ounces. For the ounce combinations, five weights and five cams are used. The weights will be designated 101, 102, 102$^a$, 105, 105$^a$, and 106, 107, 108, 109 and 110 represent corresponding cams. 101 offsets 1 ounce; 102 and 102$^a$ each offset 2 ounces; 105 and 105$^a$ each offset 5 ounces.

A preferred combination to offset from one to sixteen ounces is as follows:

| Ounces of load. | Ounce offsetting weights to be combined. |
|---|---|
| 1 | 1 |
| 2 | 2 |
| 3 | 2+1 |
| 4 | 2+2 |
| 5 | 5 |
| 6 | 5+1 |
| 7 | 5+2 |
| 8 | 5+2+1 |
| 9 | 5+2+2 |
| 10 | 5+5 |
| 11 | 5+5+1 |
| 12 | 5+5+2 |
| 13 | 5+5+2+1 |
| 14 | 5+5+2+2 |
| 15 | 5+5+2+2+1 |

The motor shaft is extended to mesh with suitable gearing 490 and drive the clutch shaft 500 of the ounce weight changing devices. Drive to the cam shaft 450 is effected in the same way as before and control is secured through a clutch 510 controlled by magnet 570. Suitable ounce indicating wheels 470 are provided which are driven by shafting 460.

The pilot weight devices for the ounces are shown in Fig. 15, with corresponding numerals 610, 630, 640, 590, 600 and are practically identical with the pound pilot devices heretofore described. The parts are, however, so proportioned that the ounce pilot devices react against the beam with a force corresponding to an ounce instead of a pound.

When ounce and pound pilot devices are used together, it is necessary that the beam have a certain amount of travel limited only by the ounce pilot devices and free of the pound pilots. I, therefore, slightly shorten the knife edges 62 relative to knife edges 620, as shown in Fig. 17$^a$. This permits the ounce devices to be in operation after the beam is clear of the pound pilots.

This arrangement causes the ounce contacts to be closed first; but this is not detrimental, since their relay is slow in action and even should ounce weights be applied improperly the weight selecting operation will continue until the beam is properly balanced by applied ounce and pound weights.

A full understanding of the operation with combined ounce and pound offsetting weights can be had by referring to the circuit diagram sheet (Fig. 20).

It will be assumed that a load of say 7 pounds and 17 ounces is applied to the scale and that the motor is started in the usual way. The beam 30 has tilted and closed first the ounce pilot contacts 590. With a heavy load amounting to one or more pounds this closure of contacts will be followed almost immediately by the closure of the pound pilot contact 59. Relay magnet 820 will be a slow relay and will not have established a circuit through 840 to the line 850 at the time the pound pilot contacts close. As soon as contacts 59 are closed, 84 will be elevated, thereby interrupting the circuit to magnet 820, and preventing any further controlling action of the ounce clutch circuit until the pound clutch circuit has completed control and effected the deposit of the proper pound weights upon the beam. When the proper pound weights are applied, the pound pilot devices will return the beam to such position as to break contacts 59. Magnet 82 will then be deenergized allowing 84 to drop to lower position and establish a return circuit from magnet 820 to line 71, through wire 850$^a$ and wire 81. The ounce pilot contacts 590 now are closed, and since relay 840 is up, current flows through the ounce clutch magnet 570 until the proper number of ounce weights are applied to the beam to cause it to be brought back to a mid position of equilibrium. When in this position, both the ounce and pound pilot contacts 590 and 59 will be open, and the parts will be at rest with the pound and ounce load displayed at the indicators 47—470.

A detailed description of the operations of the limit switches and time limit relay need not be here repeated as they function for the same purposes as heretofore described for the pound embodiment.

The operation and cycle of removing the weights and restoring the indicators is also omitted as it is merely a reversal of the steps of applying weights, except that control is through the lower pairs of pilot contacts 78ª and 780ª.

The scale which has been described is of the even balance type and retains the desirable accuracy characteristics of this form of scale. The motion of the beam is reduced to a minimum and the platform or load supporting parts have practically no movement or displacement under varying loads. This largely eliminates friction at the pivots and pivot wear. Furthermore the change in weights is effected automatically and under the control of the applied load, or more exactly under control of the overbalanced forces upon the beam which may be due to an excess of applied load over the applied weights, or an excess of weights over the load. The indication of weight is effected by the power of the driving motor and therefore the friction of the driving connections does not in any way effect the accuracy of the weighing.

While I have shown a simple hanging pan for the load support, it will be understood that any of the well known forms of platform and supporting system are contemplated and may be used for transmitting a pull proportional to the load to the even balance beam.

The pilot devices for actuating the controlling contacts also are not limited in their application to an even balance scale in which the weights are applied or removed to the beam. The pilot devices are equally adapted to control the offsetting of the load by a poise shifting device which varies the moment of the offsetting force by varying the lever arm of the offsetting weight instead of varying the moment by varying value of the weight per se, as here specifically described.

The pilot device is adapted to cooperate with the scale beam and to tend to return it to a mid-position of equilibrium when displaced by overbalancing forces due to load or weights. The pilot device thus materially speeds up the operation and secures a more definite control of the changes in the load offsetting devices. In its broad aspects the pilot device here shown has a wide application and may be used with a variety of types of scales, as will be apparent to those skilled in the art. The pilot device in cooperation with a scale beam is particularly adapted to prevent irregularities of contact control hereto prevalent in scales which have used electrical controlling devices. Some of these irregularities have been herein mentioned. One of the important advantages of the pilot device is that it bears a predetermined relation to the increments of the load offsetting values and also it preferably corresponds to the lowest unit of weight to be indicated. These features of the pilot device cause it to maintain the beam under control for minor load changes which are not desired to be offset or indicated.

However as soon as the pressure between the beam and the pilot exceeds a predetermined amount the pilot device operates and automatically calls into action the load offsetting devices. The control of the contacts is entirely based upon the loading conditions of the beam, and upon the load offsetting forces thereon, and does not depend upon any particular beam position.

I claim:—

1. A weighing scale comprising, in combination with a main scale beam having a connected load support, load offsetting weights, means for applying one or more of said weights to the beam to offset the applied load, and controlling means for the aforesaid means, comprising a device which exerts a fixed and invariable controlling force upon the beam when the latter is overbalanced.

2. A weighing scale comprising, in combination with a scale beam having load offsetting weights and a connected load support, means for shifting one or more of said weights to cause the same to react upon the beam and offset the applied load, and means for automatically controlling the shifting of weights when the beam is overbalanced by an amount corresponding to one increment of weight, said means comprising a device which in itself reacts against the beam, upon the overbalancing of the same, with an unvarying force of fixed amount which at the maximum corresponds to one weight increment.

3. A weighing scale comprising in combination with a scale beam having load offsetting weights adapted for application to a part of the scale and a load support connected to the beam, means for shifting one or more of said weights to cause the same to react upon the beam and offset an applied load, and automatically operable means for controlling the shifting of said weights upon the overbalancing of said beam by a predetermined amount of force from the applied weight or weights or from the applied load, said last mentioned means including devices which in themselves always serve to maintain the beam in equilibrium and to resist the overbalancing thereof by applied load or by applied weight or weights.

4. A weighing scale comprising in combination with a scale beam having load offsetting weights and a connected load support, means for applying one or more of said weights to the beam to offset the applied load, means automatically set in operation when the beam is overbalanced for changing the weights until the applied load is offset substantially equally thereby, said last mentional means including devices which in themselves apply resisting force to the beam against the overbalancing action thereof in either direction from excess applied weights or excess applied load.

5. A weighing scale comprising, in combination with a scale beam having a connected load support, a plurality of weights and means for shifting one or more of the same to react upon the beam and offset the applied load, a weight changing mechanism adapted to apply or remove one or more weights to and from said beam, and means for controlling the operation of said weights changing mechanism, comprising devices which, in themselves, react with a constant force upon the beam against a tendency toward overbalance thereof upon the beam tending to overbalance, said devices, when actuated by the overbalancing force of said beam, controlling said weight changing devices.

6. A weighing scale, comprising, in combination with a scale beam and load offsetting weights, and connected load support, of a weight changing device for a changing the number of weights reacting upon said beam, of controlling devices for said weight changing device comprising devices which exert a controlling force against the beam, upon its displacement when overbalanced, said controlling force bearing a predetermined relation to the offsetting value of the weights, and indicating devices controlled by the weight changing mechanism to indicate the offset load.

7. An automatic load offsetting means for a scale comprising in combination with a scale beam of the even balance type which maintains the fixed position of equilibrium or balance irrespective of the applied load, load offsetting weights adapted for application to a moving part of the scale, means for applying one or more of said load offsetting weights to said scale, and automatic means operable immediately upon and by the overbalancing of the scale by an amount equivalent to a unit of weight for controlling the operation of said weight applying means.

8. An automatic load offsetting means for a weighing scale, comprising in combination with a scale beam of the even balance type which maintains a fixed position of equilibrium or a balance irrespective of the applied load, load offsetting weights for application to a part of said scale, means for changing the weights thereon which offset the applied load, and means operable only immediately upon and by the overbalancing of said scale by a predetermined amount of weight or applied load which amount is coordinated in amount to the load offsetting weight value of the aforesaid weights for controlling the operation of said means.

9. An automatic load offsetting means for a scale, comprising in combination with a scale beam of the even balance type which maintains a fixed position of equilibrium or a balance irrespective of the applied load, load offsetting weights for application to a part of said scale, means for changing the weights thereon which offset the applied load, means operable only upon the over balancing of said scale by a predetermined amount of weight or of applied load for controlling the operation of said means, and an indicator means which is displaced by and in accordance with the operation of the weight changing means whereby the offset load is indicated.

10. A weighing scale comprising, in combination with a scale beam of the even balance type having load offsetting weights and a connected load support, a weight changing device therefor adapted to select permutations and combinations of weights and apply the same to react upon the beam and offset the applied load, and means operable upon the overbalancing of the beam for setting the said weight changing device in operation.

11. A weighing scale comprising, in combination with a scale beam of the even balance type having load offsetting weights and a connected load support, means for selecting permutations and combinations of weights and coupling the same to the beam to offset the applied load, and controlling means for the aforesaid means, said means comprising a device which in itself reacts upon the beam with a controlling force, said device when overpowered by the overbalanced beam being adapted to move and effect a weight change.

12. The invention set forth in claim 10, in which an indicator is provided having means for driving the same in unison with the weight selecting means whereby the offset load may be displayed.

13. A weighing scale comprising a scale beam of the even balance type having load offsetting weights, a connected load support, means for applying one or more of said weights thereto, said means comprising a driving motor, a weight changing mechanism driven thereby, clutch mechanism for coupling and uncoupling the motor and said weight changing mechanism, and control means, operable upon any overbalancing of the beam and by its restoration to equilibrium, for governing the action of said clutch mechanism.

14. A weighing scale comprising a scale beam of the even balance type having load offsetting weights and a connected load support, means for changing the load offsetting weights which are adapted to react thereon, a driving motor for said means, a clutch for uncoupling and coupling the motor with said means, and control devices therefor, operable upon any overbalancing of the beam to engage said clutch, and operable to disengage the same, upon the beam returning to a position of equilibrium.

15. A weighing scale comprising an even balance beam, load offsetting devices therefor comprising weight changing mechanism with provisions for depositing and removing weights to and from parts connected with the beam, a driving motor, means for coupling the motor to said mechanism when the beam is overbalanced by applied load and for uncoupling the same when the beam is restored to a position of equilibrium, an indicator, and means for driving said indicator by said motor in accordance with the driving of the weight changing mechanism to indicate the applied load.

16. In a weighing scale having controlling contacts and a scale beam having a normal position of equilibrium and displacable therefrom by the application of over-balancing forces thereto, means for actuating the controlling contacts when the overbalancing force upon the beam exceeds a predetermined amount, said means comprising a pilot device cooperating with the beam and resisting its tendency to move by a predetermined force, said force when exceeded by the overbalancing force of the beam, overpowering said pilot devices and moving the same to a position to operate the contacts.

17. The invention set forth in claim 16, in which a pair of contacts and a pair of pilot devices are included, one pilot resisting movement of the beam in one direction, and the other in the opposite direction, each pilot being ineffective upon the beam, after the same has passed the position of equilibrium and under the control of the other contact.

18. The invention set forth in claim 16, in which the pilot device comprises a weighted pivoted lever.

19. A weighing scale comprising, in combination with a scale beam, load offsetting weights therefor, a weight changing mechanism, means for controlling the operation of said mechanism comprising contact devices, and a pilot device cooperating with the beam and actuating said contacts, said pilot devices reacting against said contacts with a constant pressure irrespective of the position thereof.

20. A weighing scale comprising, in combination with a scale beam, load offsetting devices, means for controlling said devices comprising contact devices, and a pilot device cooperating with the beam with provisions to open and close said contacts, said pilot device having provisions for reacting upon said beam when the latter is overbalanced with a force equivalent to a unit of the offset load.

21. In a weighing scale comprising, in combination with a scale beam having a connected load support, of load offsetting means therefor, comprising a series of weights of one order of offsetting value, and a second series of weights of a different order of offsetting value, said beam maintaining a substantially fixed position of equilibrium irrespective of the amount of applied load or of the number of offsetting weights which are applied, and means for automatically applying the required number of said weights of either or both orders upon the application of an overbalancing load to the load support.

22. In a weighing scale comprising, in combination, a scale beam having load offsetting weights and a connected load support, a motor driven weight applying means, said means comprising devices for automatically controlling the application of the proper weights when the beam is out of equilibrium, said weight applying means comprising means for first applying permutations and combinations of weights of one order of offsetting value, and for thereafter applying permutations and combinations of other weights of a different offsetting value.

23. The invention as set forth in claim 22, in which means is provided for displacing numeral wheels in accordance with the applied weights.

24. In a weighing scale, in combination with a scale beam of the even balance type in which the beam maintains a predetermined point of balance irrespective of the appled load, load offsetting weights and a connected load support, of load offsetting devices therefore comprising a weight changing device adapted to first apply one or more weights to the beam to roughly offset the applied load, and for thereafter applying one or more other weights, to more accurately offset the load, and automatic operable means for controlling the operation of the said load offsetting means in accordance with the loading conditions of the beam.

25. The invention set forth in claim 24 in which numeral wheels are provided having means for positioning the same in accordance with the applied weights.

26. The invention set forth in claim 24, in which the weight changing device has provisions for factoring the weights and apply permutations and combinations thereof to the beam, whereby a multiplicity of loads may be offset by a less number of weights.

27. An even balance scale comprising in combination, an even balance beam having a load support operatively connected thereto, indicating means controlled by said load support, means including a governing device operated by displacement of said beam for applying a load-offsetting force to said beam, and means for preventing displacement of said beam until the equilibrium of said beam is disturbed by the application thereto, of an overbalancing force in amount at least equivalent to the smallest unit of indication of said indicating means.

28. An even balance scale comprising in combination, an even balance scale beam and having a load support operatively connected thereto, means for normally maintaining the said beam in a predetermined position of equilibrium comprising weight devices adapted to react in opposite directions upon said beam and maintain it in a normal mid position of equilibrium until said beam is overbalanced by applied loads or weights and means controlled by the application of any load, within predetermined limits, to said load support, for applying an offsetting force to said beam to restore it to said predetermined position of equilibrium.

29. In a weighing scale, in combination, an even balance scale beam, load offsetting weights therefor, devices which effect a fixed force reaction upon the beam, means conjointly controlled by the applied load and by the aforesaid devices for depositing weights thereon and means for automatically discontinuing such weight application upon the balancing of the beam.

30. In a weighing scale having load offsetting weights and a beam with an interconnected load support, and means controlled by the applied load for automatically depositing the proper weights thereon and for removing the same from the beam, in combination with limiting devices with provisions to prevent repeat operations when a load is applied in excess of the capacity of the scale.

31. In a weighing scale having load offsetting weights and a scale beam with an interconnected load support, and means controlled by the overbalancing of the beam by applied load for depositing weights thereon, and means controlled by the overbalancing of the beam by the applied weights for removing the weights therefrom, in combination with limiting devices for interrupting the weight changing operation at the end of the cycle, when a load is applied in excess of the capacity of the scale.

32. A weighing scale comprising, in combination, with a scale beam, of a load offsetting means therefor comprising means for varying the offsetting force by units or multiples thereof, means for controlling the operation of the said load offsetting means, said controlling means comprising a device which is adapted to react against the beam with an opposing force of a fixed amount tending to restore the beam to equilibrium, said force at its maximum corresponding to one unit of offsetting force or the aforesaid multiple thereof.

33. A weighing scale comprising, in combination with a scale beam, of a load offsetting means therefor comprising means for varying the offsetting force by units or multiples thereof, means for controlling the operation of said load offsetting means, said controlling means comprising a device which is adapted to react against the beam with an opposing force tending to restore the beam to equilibrium, said force at its maximum corresponding to one unit of offsetting force or the aforesaid multiple thereof and means cooperating with said device for preventing the same from reacting with controlling force upon the beam when the latter is in a position of equilibrium.

34. In a weighing scale having load offsetting weights and a beam with an interconnected load support, and means controlled by the applied load for automatically depositing the proper weights thereon and for removing the same from the beam, in combination with limiting devices controlled by the applied load when the same reaches the capacity of the scale, and means controlled by said limiting devices for interrupting the operation of the weight depositing means when a load is applied in excess of the capacity of the scale whereby repeat operations are prevented.

35. In a weighing scale having load offsetting weights and a scale beam with an interconnected load support, and means controlled by the overbalancing of the beam by applied load for depositing weights thereon, and means controlled by the overbalancing of the beam by the applied weights for removing the weights therefrom, in combination with limiting devices controlled by means variably displaced in accordance with applied load, and means controlled by said limiting devices for interrupting the operation of the weight depositing means at the end of its cycle, when a load is applied in excess of the capacity of the scale.

In testimony whereof I hereto affix my signature.

JAMES W. BRYCE.